Patented Aug. 25, 1953

2,649,841

UNITED STATES PATENT OFFICE 2,649,841

HYDRAULIC PISTON POSITIONING SYSTEM

Stanley A. Jacques, Chicago, Ill., assignor to Askania Regulator Company, Chicago, Ill., a corporation of Illinois Application February 15, 1951, Serial No. 211,039

1 Claim. (Cl. 121—41)

The present invention relates to hydraulic power units of the type having a pair of inputs and an output member that is selectively driven in opposite directions by delivering fluid under pressure to one input and exhausting the other input. A piston and cylinder assembly having a pair of fluid lines communicating with opposite ends of the cylinder and to opposite sides of the piston is typical of a hydraulic power unit of the kind in question.

In systems of this kind it is frequently desirable so to actuate the power unit that its output member is brought to a position selected by an operator. Commonly, such positioning is accomplished by an operation known as "inching," which involves operation of a valve control arrangement to apply fluid pressure to one and the other of the power unit inputs until the output member has been brought to its desired position. Frequently it is desirable to make provision for actuating a hydraulic power unit to bring its output member to a selected position by control from a remote location.

A primary object of the invention is to provide a novel system for actuating a power unit of the type in question whereby its output member may be brought to a selected position without resort to inching.

Another object is to provide such a system wherein actuation of the power unit may be controlled from a remote location.

Still another object is the provision of a novel combination electrical and hydraulic system for positioning control of the output member of a hydraulic power unit of the kind in question.

In the accompanying drawings:

Fig. 3 is a transverse section of a selector valve assembly, on a plane indicated by line 3—3 of Fig. 1.

Fig. 4 is a similar view on a plane indicated by line 4—4 of Fig. 1.

Fig. 5 is a similar view on a plane indicated by line 5—5 of Fig. 1.

Fig. 6 is a similar view on a plane indicated by line 6—6 of Fig. 1.

Figure 1:
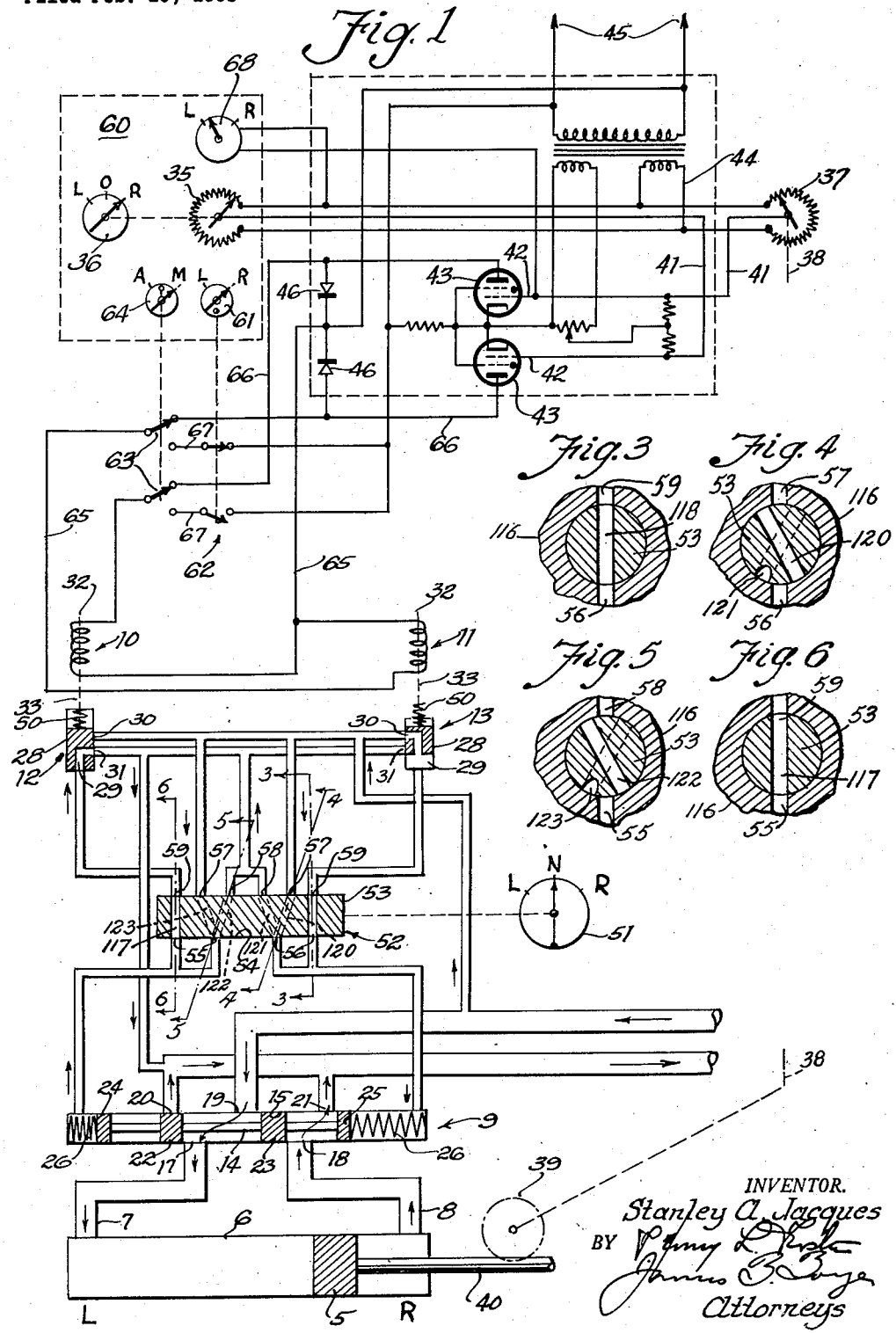
Fig. 1 is a schematic diagram disclosing a combined hydraulic and electrical system arranged in accordance with the invention.

First referring to Fig. 1, the hydraulic power unit of the kind in question comprises a piston 5 that is reciprocable in a cylinder 6. It has at its opposite ends hydraulic lines 7 and 8. In accordance with the invention a transfer valve assembly 9 is arranged to connect selectively and in reversed order one of lines 7, 8 to a source of fluid under pressure and the other to exhaust. Further, in accordance with the invention the transfer valve is controlled hydraulically by a pair of solenoids 10, 11, that respectively actuate three-way valves 12, 13 to operate transfer valve 9 to selectively establish connections of lines 7 and 8 to supply and exhaust.

Transfer valve 9 comprises a body 14 that is axially movable in a valve bore 15 provided with a system of axially spaced ports including controlled ports 17, 18, a single port 19 of one character as supply or exhaust, and a pair of ports 20, 21 that are of the same character and opposite to that of port 19. A pair of lands 22, 23 of valve body 14 respectively are movable from neutral positions wherein they block ports 17, 18, by movement of valve body 14 in opposite directions respectively to connect the control ports with ports 19, 21, for appropriate connection of lines 7, 8 to supply and exhaust. As is conventional in hydraulic practice, port 19, which is axially spaced from and between ports 20, 21, is shown as a supply port, and ports 20, 21 as exhaust ports. Transfer valve 9 includes a hydraulic operating system shown as a pair of piston portions 24, 25 of the valve body that respectively operate in end reaches of bore 15 as cylinders. Centering springs 26 serve to move the valve body to the neutral position wherein body parts 22, 23 block the control ports when pressures are present in the end reaches of the bore are equal.

Each of the solenoid controlled valves 12, 13 is a three-way valve comprising a valve body 28 that is movable in a chamber between two positions that respectively are effective to connect a controlled port 29 with a supply port 30, and to connect port 29 with an exhaust port 31. These valve bodies 28 are connected to the armatures 32 of the respective solenoids 10 and 11 by mechanical connections 33.

For proper control of solenoids 10, 11, a signal system is employed that has a pair of outputs and that is responsive to sense of an error to energize one or the other of such outputs. In the arrangement shown in Fig. 1, the signal system comprises a transmitter member 35 that is manually adjustable by such a control device as a dial 36. A repeater device 37 is arranged to be actuated by the movement of piston 5 as by a mechanical connecting system 38 having an input element 39 driven by piston rod 40. In the specific signal arrangement shown, transmitter and repeater 35, 37 are of the differential output type and are shown as potentiometers connected in bridge arrangement to develop across a pair of output lines 41 a signal having a sense that corresponds to the sense of disagreement between end moveable elements.

Output lines 41 are connected to a conventional electron relay arrangement by respective connection to the control grids 42 of a pair of gaseous discharge tubes 43. In the arrangement shown the potentiometers are energized by alternating current supplied from a transformer secondary 44 and the anode circuits of tubes 43 are connected to the same supply 45 that energizes secondary 44. The anode circuits of the tubes 43 respectively include the windings of solenoids 10, 11. By this circuit arrangement a firing signal voltage is applied to the grid 42 of one of tubes 43 in correspondence to an application of a positive half-cycle to its anode while a negative voltage will be applied to the grid 42 of the other tube during application of a positive half-cycle to its anode. A pair of rectifiers 46 respectively are connected across the solenoid windings 32 to extinguish conduction of tubes 43 during negative half-cycles of anode voltages following conductive positive half-cycles of anode voltages, which tends to occur due to the high inductance of windings 32 that tends to maintain positive voltages applied to the anodes after conductive half-cycles.

By the arrangements so far described, any variance from correspondence in the positions of the manually actuable selector 36 and piston 5 will result in unbalance of the bridge formed by the resistances of potentiometers 35, 37, and, as described, the resulting signal output of the bridge will fire one or the other tube 43 thereby energizing the coil 32 of one of the solenoids 10, 11 to operate one of the valve bodies 28. These valve bodies 28 are biased to a preselected one of their two positions by springs 50. In the arrangement shown, both of the valves bodies 28 are biased to their positions wherein controlled ports 29 are connected to exhaust ports 31. When the winding of the connected solenoid is energized as the winding of solenoid 11 is shown to be, the body 28 of the valve connected to that solenoid is shifted to its position connecting controlled port 29 with supply port 30. In this way the cylinder lines 7, 8 are, through actuation of the body of transfer valve 9, in correspondence to the identity of the actuated solenoid 10 or 11, and, consequently, to the sense of the signal output of the bridge 35, 37 connected to supply and exhaust in a sense to operate piston 5 in a direction to reduce the positional variance responsible for the bridge output.

The system so far described lends itself to insertion of a hydraulic system provided with other means for controlling the operation of the piston. In Fig. 1 such a device is shown as a simple mechanical control 51 that is actuable to cause the piston to move to the right or to the left. The actuator 51 is connected to operate a selector valve 52 which is shown as a rotatable valve body 53 that serves to connect the end reaches of transfer valve bore 15 with supply and exhaust or with the controlled ports 29 of the solenoid valves 12, 13 in accordance with the position of the valve body 53. Valve body 53 is rotatable in a bore 54 that has controlled ports 55, 56 respectively communicating with the two ends of transfer valve bore 15, supply ports 57 that are selectively connectible with controlled ports 55, 56, exhaust ports 58 that are selectively connectible with the controlled ports in the reverse sense to supply ports 57, and auxiliary input ports 59 that are both connectible or disconnectible simultaneously with controlled ports 55, 56 when the latter are disconnected from all of the supply and exhaust ports 57, 58.

It is preferable that a system of controls for the system be located remote from an operating station that includes piston and cylinder assembly 5 and 6 and the manual control member 51. Such a remote control station is shown at 60 in Fig. 1. In addition to the transmitter of the signal system and the manual actuator 36, it may include a second manual actuator 61, the control function of which closely resembles actuator 51. The function of control 61 is to operate solenoids 10, 11 to produce a desired direction of movement of piston 5. A set of switches 62 includes a pair of switches 63 that are simultaneously movable by a switch controller 64 to connect the solenoid winding lines 65, either in series with the anode lines 66 of tubes 43 or with a pair of switches 67 that are actuable by manual control actuator 61 to connect switches 63 in series with the solenoid windings across supply 45. It will be noted that switches 67 are manually connected to manual actuator 61 so that one switch is opened when the other is closed. It will be understood that these switches are arranged to connect the solenoids in a sense to supply cylinder 6 to move piston 5 in the direction required by the position of actuator 61. In addition to the controls described at station 60, it is desirable to include an indicator to show the position of piston 5 and its output member 40. Such an indicator may be a volt meter type of instrument 68 having its lines connecting between the movable tap of the potentiometer of repeater 37 and one of the lines connecting corresponding ends of the transmitter and repeater potentiometers.

Figure 2:
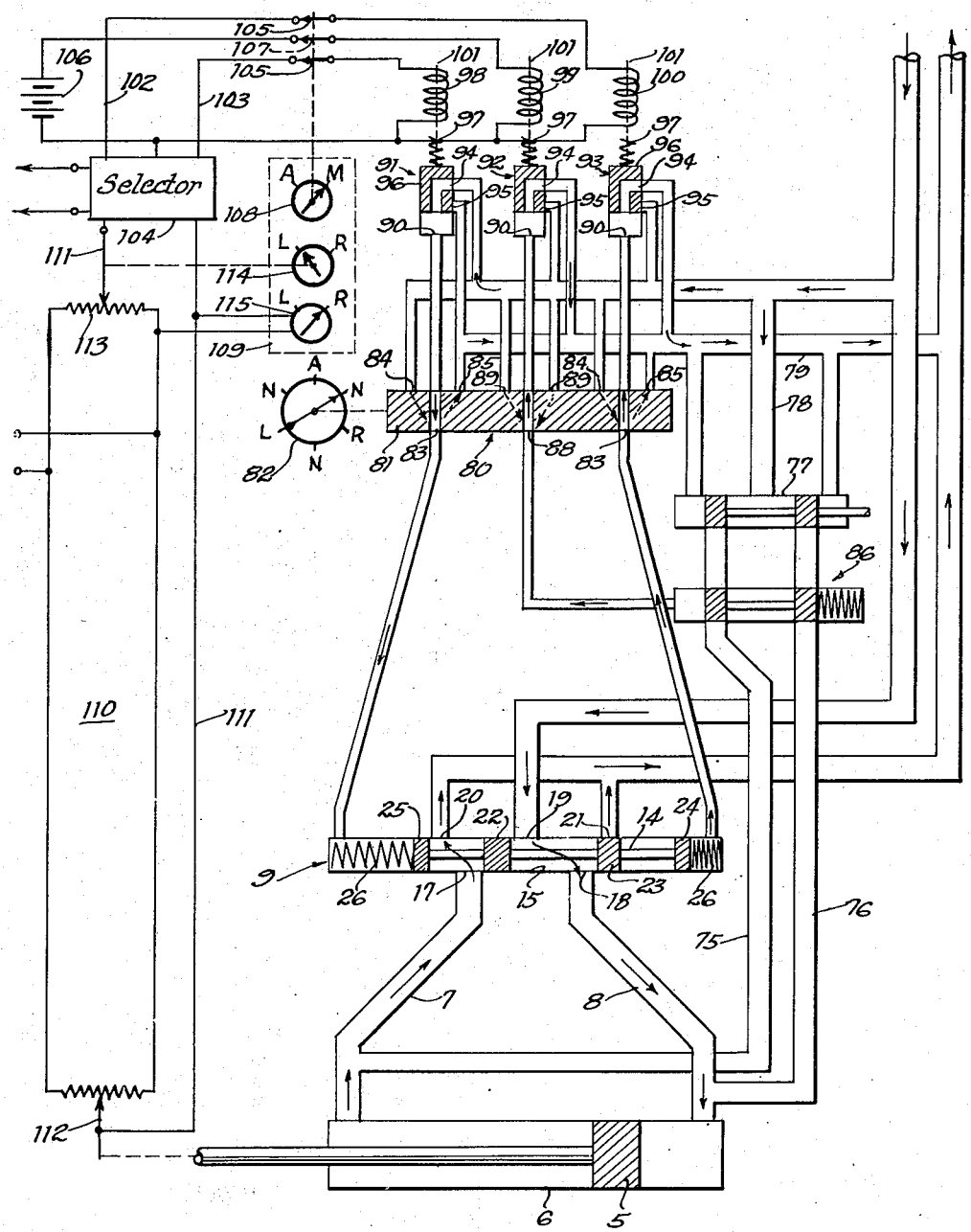
Fig. 2 is a schematic diagram of a more complex system that includes the basic system type disclosed and claimed by my copending application for United States patent, Serial Number 184,972.

The system of Fig. 2 discloses the system of the instant invention arranged in a more complex hydraulic control system of the type disclosed by my above-identified application, Serial No. 184,972. The piston and cylinder and transfer valve assemblies are the same as those described above and the same numbers are applied to them. However, the piston lines 7, 8 are connected with branch lines 75, 76 that constitute the output lines of an automatic control channel that includes a conventional pilot valve 77 arranged to connect in reversed senses the branch lines 75, 76 with a supply line 78 and an exhaust line 79.

The system also includes a manual control channel including a selector valve 80 that is essentially the same as selector valve 52 of Fig. 1. This valve again comprises a rotatable valve body 81 that is rotatable between two manual control positions designated "L" and "R" at the actuator device 82, wherein the valve body 81 connects controlled ports 83 with supply and the exhaust ports 84, 85 in a proper sense to actuate the body of transfer valve 9 to supply and exhaust, and the respective ends of cylinder 6 in a sense to produce leftward or rightward movement of piston 5.

The branch cylinder lines 75, 76 pass through a cut-off valve 86 having two positions that respectively are effective to block or open lines 75, 76. Cut-off valve 86 is hydraulically operable and spring biased and its actuation is controlled by selector valve body 81 to block lines 75, 76 when valve body 81 is turned to either of its above-mentioned manual control positions. This is accomplished by connection of a controlled port 88 with one of two supply ports 89 respectively when the valve body 81 is turned to one or the other of those positions. Reference is made to the above-identified application for detailed disclosure of a valve arrangement suitable for use in the system in question.

For control by an electrical system such as in Fig. 1, or its equivalent, valve body 81 is arranged to connect, when it is in one of its positions designated "N" at actuator 82, all of controlled ports 83, 88 with controlled ports 90 of three two-way valves 91, 92, 93 that are arranged similar to two-way valves 12, 13 of Fig. 1, having supply ports 94 and exhaust ports 95 that are selectively connectible with controlled ports 90 by movement of valve bodies 96 to two positions. These valve bodies 96 respectively are biased to one of their positions by springs 97 and are moveable to their other positions by energization of solenoid windings 98, 99, and 100 by connection of valve bodies 96 to armatures 101 operatively associated with the respective windings.

For setting up the position control of piston 5, the solenoid windings 98, 100, energization of which controls supply and exhaust of the end reaches of transfer valve bore 15, are connected in the two outputs 102, 103 of a device 104 that is responsive to sense of an input signal to energize one or the other of its outputs. Connection for position control or disconnection for operation of the piston under manual control of actuator 82, or automatic operation under control of pilot valve 77, is accomplished by a pair of switches 105. Solenoid winding 99 is connected and disconnected to and from a source of power 106 by a third switch 107 that is ganged with switches 105 for actuation by a control member 108 at the control station 109.

The signal system again comprises a potentiometer bridge network 110 having a null circuit connected between variable voltage members, one of which 112 is actuated by piston 5 and the other 113 being operable by a manual position selector 114. A position indicator 115 again may comprise a voltage measuring instrument connected between the output member of repeater 112 and one of the bridge lines.

It will be seen from the arrangement of the control station 60 of Fig. 1 and the control station 109 of Fig. 2 that to establish control by the electrical system it is first necessary to establish connection of the solenoid windings with the electrical system. Thereafter, positioning control of the piston may be accomplished in the system of Fig. 1 either by actuating the positioning member 36 which sets about the relay control operation of the solenoids as described, or by movement of the direction manual actuator 61 which directly controls movement of piston 5 without correspondence of its position to the setting of the actuator. In the system of Fig. 2 there is no direction actuator corresponding to 61 of Fig. 1. Otherwise, the general operation of the system is entirely similar involving closing of switches 105, 107 for establishment of positioning control as selected by actuator 114.

Now referring to Figs. 3 to 6, which show different sections through a form of control valve suitable for use as the selector valve 52 of Fig. 1, casing structure 116 encloses bore 54 wherein valve body 53 is rotatable, and into which open the controlled ports 55 and 56 the supply ports 57 and exhaust ports 58, and the ports 59 that are connected with the controlled ports 59 of three way valves 12, 13. As shown respectively by Figs. 3 and 6, valve body 53 is provided with a pair of parallel diametric passages 117, 118, spaced apart to register respectively with and interconnect the corresponding pairs of ports 55, 59 and 56, 59 while valve body 53 is in its angular position corresponding to the "N" position of the control actuator 51. As described above, this position of valve body 53 conditions the system for control by the solenoid-actuated valve assemblies 12, 13, and the electrical remote control system that energizes and deenergizes the solenoids.

The valve body 53 also has two pairs of passages that control connection of the respective transfer valve actuation ports 55, 56 with supply and exhaust in selected angular positions of the valve body. These passages 120, 121, 122, 123 are shown as angularly related to the axis of the valve body, and are out of registration with their corresponding ports 55, 56 and all of the supply and exhaust ports 55, 56 and all of the supply and exhaust ports 57, 58. In one of the actuating positions of valve body 53 passages 120, 122 connect the inner controlled ports 55, 56 respectively with supply and exhaust. In the other such position the inner controlled ports 55, 56 respectively are connected with exhaust and supply by the angular passages 121, 123. In both of these positions passages 117, 118 are out of registration with their corresponding ports 55, 59 and 56, 59.

I claim:

A system for positioning, in correspondence with the position of a movable control member, the output element of a hydraulic power unit that is operable in opposite directions respectively by reversely supplying pressure fluid to one and exhausting the other of a pair of fluid inputs of said unit; said system comprising a transfer valve having a body movable from a position blocking supply to both said inputs in opposite directions to different active positions wherein respectively it is effective to exhaust and supply the different said inputs in reversed senses, spring means resiliently biasing said valve body to its neutral position, expansible chamber means having a pair of inputs and arranged to move said valve body in said opposite directions respectively by exhausting and supplying pressure fluid to the different ones of said operator means inputs in reversed senses, a pair of three-way valves each having a controlled port connected with one of said operator means inputs, a supply port, an exhaust port and a valve body movable between two positions respectively effective to connect said supply and exhaust ports with said controlled port, spring means biasing each said three-way valve body to a selected one of its said positions, a pair of solenoids each having an armature connected with a different one of said three-way valve bodies and electrically energizable to move said body to which it is connected to its second position, an electrical device having a pair of output circuits each connected to energize a different one of said solenoids, said electrical device having a signal input circuit and being responsive to sense of a signal applied to the latter circuit to energize a corresponding one of said output circuits, a signal system including a transmitter device actuable by said control member and a repeater device actuable by said output element, said signal system being arranged and connected with said signal input circuit to apply thereto a signal corresponding in sense to sense of variance of said member and element from positional correspondence and to energize one of said solenoids to move the one of said three-way valve bodies that actuates said transfer valve body in a direction to supply and exhaust said power unit inputs in a sense to move said output element toward positional correspondence with said control element, and a selector valve having a valve body movable from a position wherein it connects said operator means inputs with said three-way valve controlled ports in opposite directions respectively to second and third positions in both of which it blocks communication between said three-way valve controlled ports and operator means inputs, and in the different ones of which respectively it connects said operator means inputs in reversed senses with fluid supply and exhaust lines.

STANLEY A. JACQUES.

References Cited in the file of this patent

UNITED STATES PATENTS

| Number | Name | Date |
|---|---|---|
| 2,019,766 | Peterson | Nov. 5, 1935 |
| 2,390,425 | Crum | Dec. 4, 1945 |
| 2,409,517 | Schmit | Oct. 15, 1946 |
| 2,416,097 | Hansen, Jr., et al. | Feb. 18, 1947 |